United States Patent [19]
Thompson

[11] Patent Number: 5,165,379
[45] Date of Patent: Nov. 24, 1992

[54] AUTOMOTIVE FUEL TANK VAPOR CONTROL SYSTEM

[75] Inventor: Robert H. Thompson, Redford, Mich.

[73] Assignee: Ford Motor Company, Dearborn, Mich.

[21] Appl. No.: 742,825

[22] Filed: Aug. 9, 1991

[51] Int. Cl.$^5$ .............................. F02M 33/02
[52] U.S. Cl. ................... 123/520; 123/516; 220/283; 280/834
[58] Field of Search .............. 123/520, 521, 516, 518, 123/519; 220/85 UR, 85 F, 85 US, 86 R, 203

[56] References Cited

U.S. PATENT DOCUMENTS

| | | | |
|---|---|---|---|
| 3,575,107 | 6/1970 | Joyce | 123/520 |
| 3,575,152 | 4/1971 | Wentworth | 123/520 |
| 4,714,172 | 12/1987 | Morris . | |
| 4,742,809 | 5/1988 | Ito et al. . | |
| 4,787,529 | 11/1988 | Harris . | |
| 4,790,283 | 12/1988 | Uranishi | 123/520 |
| 4,790,349 | 12/1988 | Harrs . | |
| 4,796,593 | 1/1989 | Woodcock et al. . | |
| 4,816,045 | 3/1989 | Szlaga et al. . | |
| 4,862,856 | 9/1989 | Yokoe | 123/519 |
| 4,872,439 | 10/1989 | Sonada | 123/519 |
| 4,874,029 | 10/1989 | Bucci . | |
| 4,881,578 | 11/1989 | Rich et al. . | |
| 4,887,578 | 12/1989 | Woodcock | 123/520 |
| 5,056,494 | 10/1991 | Kayanuma | 123/519 |

FOREIGN PATENT DOCUMENTS

0128650 10/1980 Japan ...................... 123/520

*Primary Examiner*—Carl S. Miller
*Attorney, Agent, or Firm*—Jerome R. Drouillard; Roger L. May

[57] ABSTRACT

An automotive fuel tank and vapor control system includes a fuel tank with a fill tube for introducing liquid fuel into the tank, with the fill tube having a closure device and primary and refueling vapor conduits for conducting fuel vapors to a collection canister. A fluidic logic controller connected to the primary and refueling vapor conduits and to a sensor conduit positioned to sense the fluid pressure within the fill tube in the region in which the closure device is installed switches the flow of fuel vapor from the fuel tank to either the primary conduit or the refueling conduit, depending upon whether the closure device is open or closed.

16 Claims, 4 Drawing Sheets

AUTOMOTIVE FUEL TANK VAPOR CONTROL SYSTEM

BACKGROUND OF THE INVENTION

1. Field of the Invention

This invention relates to a fuel tank and fuel vapor control system for use with an air breathing, liquid fueled automotive vehicle engine.

2. Disclosure Information

The emission of fuel vapor from gasoline fueled automotive vehicles has been controlled for many years. Commonly used evaporative control systems employ a carbon canister for storing fuel vapors generated by the evaporation of liquid fuel from the vehicle's fuel tank. Vapors are conducted through a suitable valve system and conduit to the carbon canister when the engine is not running. During operation of the vehicle engine, fresh air will be drawn over the storage medium in the canister so as to purge collected vapors from the canister.

In the future, vehicles it is likely that vehicles will be required to have the capability of capturing and storing fuel vapor not only during normal operation of the vehicle but also during refueling.

The collection and processing of vapors during a refueling operation present a special challenge to the designer of an evaporative emission control system because large quantities of vapor are generated during the relatively short time of refueling. And, the vehicle engine is usually not operating during a refueling process. As a result, the vapor collection system must be sized so that the entire amount of vapor generated during the refueling process can be captured and stored.

U.S. Pat. No. 4,787,529 to Harris discloses a vapor-liquid control fuel cap having a complex valving system for not only closing the fuel tank filler neck and for relieving pressure and vacuum, but also for controlling fuel spillage in the event of a vehicle rollover. The system disclosed in the '529 patent does not, however, include means for routing fuel vapor to one or more collection canisters selectively.

U.S. Pat. No. 4,874,020 to Bucci discloses a system for controlling fuel vapors in which a valve is controlled by the physical insertion of a fill cap into the filler neck. The system of the '020 patent suffers from the disadvantage that fuel pressure will be allowed to build up during the time the tank cap is installed. This is undesirable because the high pressure within the tank may cause expulsion of the fuel when the cap is removed.

U.S. Pat. No. 4,742,809 to Ito et al. and U.S. Pat. No. 4,881,578 to Rich et al. disclose vapor control systems having valves displaced by a fuel nozzle so as to control vapor flow. Such systems suffer from the problem that mechanical wear and rough handling may render the valves inoperative.

U.S. Pat. No. 4,796,593 to Woodcock et al. discloses an onboard fuel vapor recovery system in which a valve mounted in the top of a fuel tank has a float which also functions as a valve to prevent excessive filling of the fuel tank. This system will not selectively establish vapor pathways for controlling flow both during refueling and during normal operation of the vehicle.

U.S. Pat. No. 4,790,349 to Harris and U.S. Pat. No. 4,816,045 to Szlaga et al. disclose, in the first case, a valve mounted in the top of the fuel tank, and in the second case, a valving system mounted in the filler neck, both of which control flow during the flow of vapors generated during refueling but not during normal operation of the vehicle.

U.S. Pat. No. 4,714,172 to Morris similarly controls vapor generated during refueling of the vehicle but not otherwise, but does include a system for sensing the presence of the fuel filler cap for controlling flow during refueling.

It is an object of the present invention to provide a system which controls not only fuel vapor generated during normal operation of the vehicle, but also vapors generated during refueling operation.

It is another object of the present invention to provide a system for controlling vapor during normal operation and refueling operation so as to allow switching between two flow paths selectively, based on whether the fuel filler cap is installed or not.

It is another object of the present invention to provide an automotive fuel vapor control system which will help to avoid overfilling of the fuel tank. It is sometimes desirable to avoid overfilling because in the event that the vehicle is improperly fueled such that substantially all of the space within the tank is filled with liquid fuel, subsequent expansion of the fuel may cause the evaporative emission control canister to become flooded with liquid fuel, thereby impairing its capacity.

It is an advantage of the present invention that a system according to this invention will have the capability of controlling evaporative and refueling emissions to the degree likely to be required by more stringent governmental regulations applicable to such emissions.

Other objects, features, and advantages of the present invention will become apparent to the reader of this specification.

SUMMARY OF THE INVENTION

A fuel tank and fuel vapor control system for use with an air-breathing, liquid fueled automotive vehicle engine includes a fuel tank, a filler tube for introducing liquid fuel into the tank, and a manually actuatable cap, combined with a primary vapor conduit for conducting fuel vapor from the tank when the cap is installed, a refueling vapor conduit for conducting fuel vapor from the cap when the cap is removed for refueling, a canister for collecting fuel vapor from the tank, and a fluidic logic controller connected to the canister and to the primary and refueling vapor conduits, and further connected to a sensor conduit positioned to sense the fluid pressure within the fill tube in the region in which the cap is installed, with the controller comprising means for establishing a vapor pathway extending between the refueling vapor conduit and the canister when the fluid pressure within the sensor conduit is at a level indicating that the cap has been removed. The controller further comprises means for establishing a vapor pathway extending between the primary vapor conduit and the canister when the pressure within the sensor conduit is at a level indicating that the cap has been installed. A fuel tank and fuel vapor control system according to the present invention may further comprise a rollover valve positioned within the primary vapor conduit either between the fuel tank and the controller so that the rollover valve will restrict the passage of liquid fuel from the tank into the controller in the event that a vehicle equipped with a system according to the present invention is displaced from its normal operational attitude by more than a predetermined amount. A system according to the present invention may further comprise a liquid/vapor discriminator valve, either positioned in the refueling vapor conduit between the fuel tank in the controller so as to restrict entry of liquid fuel into the control valve during refueling operation, or having the liquid/vapor discriminator valve positioned between the canister and the controller for the same purpose. A fuel tank and vapor control system according to the present invention may further comprise a purge conduit extending between the fuel vapor collection canister and the air intake valve of the engine so as to permit the passage of fuel vapors from the canister into the engine, with such passage being controlled by a purge valve positioned in the purge conduit between the canister and the engine. Finally, a system according to the present invention may further comprise means for allowing a restrictive flow between the primary vapor conduit and the canister when the cap has been removed.

DETAILED DESCRIPTION OF THE PREFERRED EMBODIMENTS

Figure 1:
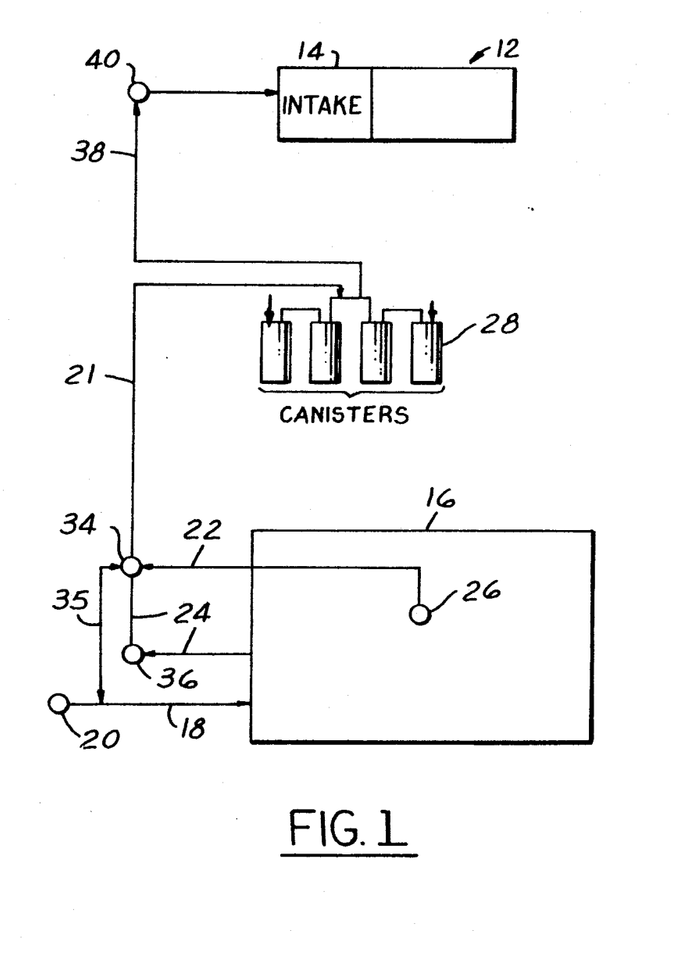
FIG. 1 is a schematic illustration of a first embodiment of a system according to the present invention in which a single array of canisters is used for collecting fuel vapor produced in the fuel tank of the vehicle.

As shown in FIG. 1, a fuel tank and fuel vapor control system for use with an air breathing, liquid fueled automotive vehicle engine 12 having air intake system 14 includes fuel tank 16 having two vapor outlets, with the first comprising a rollover valve, which restricts the passage of liquid fuel out of the tank in the event that a vehicle equipped with a system according to this invention is displaced from its normal operational attitude by more than a predetermined amount. In other words, should the vehicle be caused to tip to an extent greater than normal operation would dictate, rollover valve 26 will prevent liquid fuel from leaving fuel tank 16. The rollover valve allows the passage of vapor generated during normal operation of the vehicle by evaporation of fuel within the fuel tank to pass into primary vapor conduit 22 and through fluid logic controller 34 to an integrated canister array 28. Those skilled in the art will appreciate in view of this disclosure that although a plurality of canisters is illustrated in FIG. 1, a single canister could be used to perform the function of collecting fuel vapor from the fuel tank.

FIG. 1 illustrates a refueling vapor conduit 24, which may comprise a fill vent extending part way into fuel tank 16 so that during refueling of the vehicle, vapors will be allowed to pass through refueling vapor conduit 24 and through liquid vapor discriminator 36 and then into fluidic logic controller 34. The inlet of refueling vapor conduit 24 is situated so that the inlet will be covered by liquid fuel when the level of fuel within the fuel tank is at a point at which sufficient space remains within the fuel tank to allow for expansion of liquid fuel due to normal ambient temperature excursions. As the tank is filled so that liquid fuel begins to rise in the inlet of refueling vapor conduit 24, liquid vapor discriminator valve 36 will close, thereby causing a column of fuel to build within fill tube 18 so as to shut off a fuel nozzle inserted into the filler tube.

Filler tube 18 is equipped with a provision allowing installation of a closure device, 20, thereupon. Those skilled in the art will appreciate in view of this disclosure that such a device could include a manually operable filler cap, a solenoid operated port, a capless closure system, or other types of closure devices known to those skilled in art and suggested by this disclosure. For the sake of convenience, such devices are collectively referred to herein as a "filler cap" or "fuel cap". Sensor conduit 35 has a first end positioned to sense the fluid pressure within fill tube 18 in the region of the fill tube upon which cap 20 is installed. This allows sensor conduit 35 to transmit an increased pressure to fluid logic controller 34, in effect the fuel tank pressure, once fuel cap 20 has been installed, whereas sensor conduit 35 transmits only atmospheric pressure to fluid logic controller 34 in the event that cap 20 has been removed. Sensor conduit 35 thus performs the important function of allowing fluidic logic controller 34 to perform the necessary switching between primary vapor conduit 22 and refueling vapor conduit 24. Switching is necessary because during refueling large amounts of vapor are generated and this vapor must be handled through a high capacity vapor transfer system. On the other hand, during normal operation with the fuel cap installed, it is necessary to handle vapor contained within the upper region of the fuel tank above the liquid, while preventing liquid fuel from entering the vapor collection system. As a result, the fluidic controller of the present system is required to accomplish the changeover from refueling to normal operation.

Figure 2:
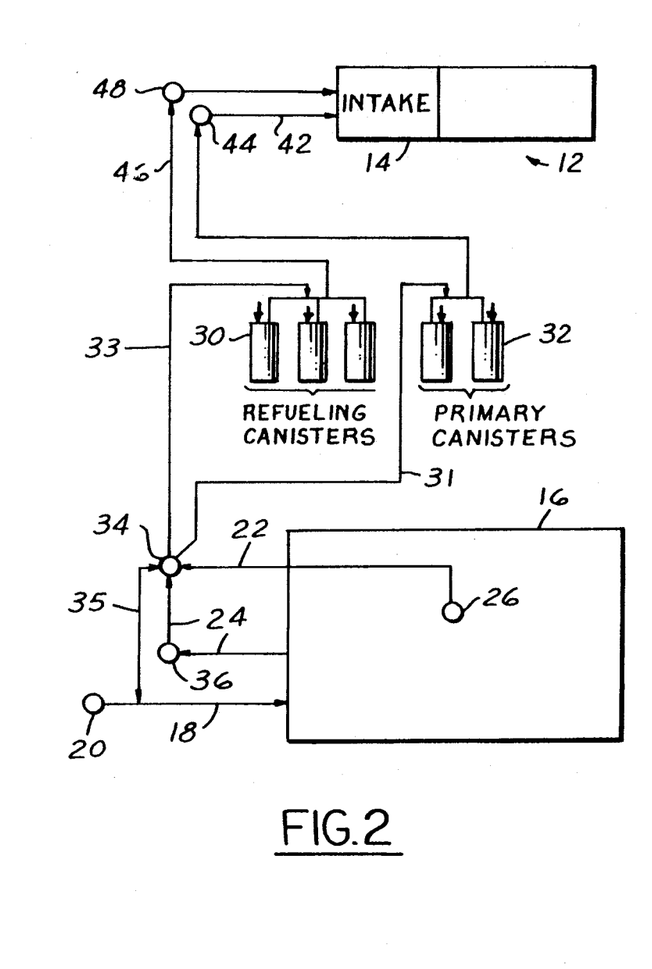
FIG. 2 is a schematic representation similar to FIG. 1 but different insofar as separate canister arrays 30 and 32 are used for refueling and primary operation, respectively.

FIG. 2 illustrates a second embodiment according to the present invention in which the integrated canister array 28 of FIG. 1 has been replaced by refueling canisters 30, which are intended to accommodate vapors generated only during refueling of a vehicle having a system according to the present invention, and primary canisters 32, which are intended to accommodate fuel vapors generated during the normal operation (e.g., during driving of the vehicle). As before, fuel vapors generated during normal operation of the vehicle move from fuel tank 16 through rollover valve 26 and primary vapor conduit 22 into fluidic logic controller 34. And, vapors generated during refueling move through refueling vapor conduit 24 and liquid vapor discriminator 36 into fluidic logic controller 34. Also, sensor conduit 35 extending between fill tube 18 and fluidic logic controller 34 allows the logic controller to sense the presence of fill cap 20. A difference between the systems shown in FIG. 1 and 2 resides, of course, in the operation of fluidic logic controller 34 in terms of routing the vapor produced during normal operation and during refueling. Thus, upon sensing the removal of cap 20 from filler pipe 18, fluidic logic controller 34 will establish a single vapor pathway extending between refueling vapor conduit 24 and refueling canister array 30 via refueling canister conduit 33 when the pressure within the sensor conduit is at a level indicating that cap 20 has been removed from fill tube 18. Fluidic logic controller 34 will establish a different vapor pathway extending between primary vapor conduit 22 and primary canister array 32 via primary canister conduit 31 when the pressure with the sensor conduit is at an elevated level indicating that cap 20 has been installed.

Yet another difference between the embodiments of FIGS. 1 and 2 resides in the purging of the vapor collection canisters. As is well known to those skilled in the art, such canisters must be regenerated periodically by moving fresh air through the canisters so as to cause the vapors stored within the storage medium contained in the canister to be outgassed and drawn into the intake system of the engine for burning. In FIG. 1, a single purge conduit 38 is shown as being connected to a single purge valve 40 through which the vapors flow into the air intake system 14 of engine 12. However, as shown in FIG. 2, separate refueling purge conduit 46 and refueling vapor valve 48 are used to handle refueling vapors stored in refueling canister array 30, whereas unique primary purge conduit 42 and primary purge valve 44 are employed for the purpose of controlling the regeneration of primary canister array 32. With both systems, the vapors are conducted to air intake 14 of engine 12.

Figure 3:
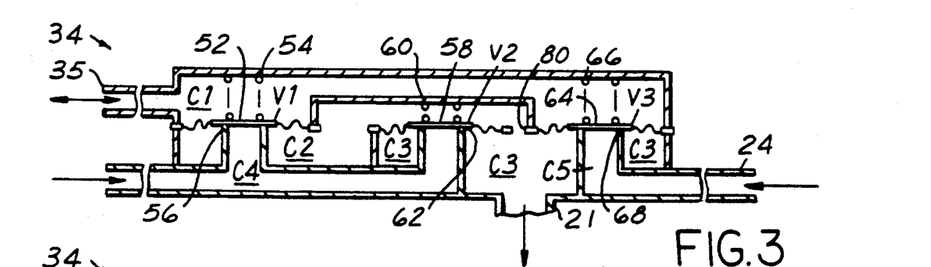
FIG. 3 schematically illustrates a fluid logic controller, according to the present invention, in the operational state in which all of the valve elements of the controller are closed.
Figure 4:
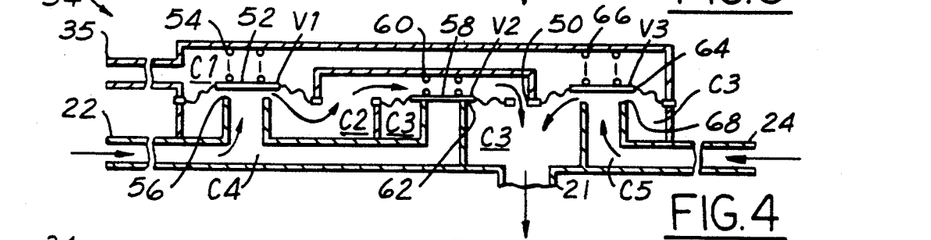
FIG. 4 illustrates the fluid logic controller of FIG. 3 in which the fuel cap is removed and the logic controller is positioned to allow vapor to flow from a refueling vapor conduit into an integrated canister array.
Figure 5:
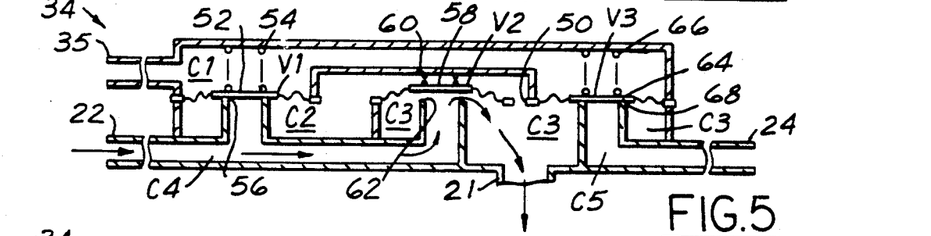
FIG. 5 illustrates the controller of FIGS. 3 and 4, but in the operational condition in which the fuel cap has been installed so that the controller will allow vapors generated within the tank during normal operating conditions to be vented to an integrated collection canister array.

FIGS. 3-5 illustrate a first embodiment of a fluidic logic controller according to the present invention. The controller of FIGS. 3-5 is best described as an integrated diaphragm controller. The controller is integrated because it directs fuel vapors to a single integrated collection canister array as is shown in FIG. 1; it is a diaphragm controller because vapors are controlled by means of diaphragm valves.

Beginning with FIG. 3, fluid logic controller 34 is connected to sensor conduit 35 which leads to chamber 1, which chamber is labeled C1 in FIG. 3. Primary vapor conduit 22 leads directly to chamber C4, and via valve V1, having diaphragm 52 which is urged to a closed position by spring 54 against seat 56, into chamber C2. Gases entering chamber C2 may enter chamber C3 via orifice 50. Having entered chamber C3, vapor/air mixture passing through the fluidic logic controller may then move through canister conduit 21, into canister array 28 (see FIG. 1). Alternatively, vapors entering chamber C4 may enter chamber C3 and then flow to canister array 28 through canister conduit 21 after passing through valve V2, which consists of valve diaphragm 58 which is urged into a closed position by means of spring 60 against seat 62. Finally, vapors originating in the fuel tank and passing through refueling vapor conduit 24 past liquid vapor discriminator 36 (see FIG. 1) will flow through chamber C5 and then into chamber C3 and then into canister array 28 after passing through valve V3, which includes diaphragm 64 and spring 66, which biases diaphragm 64 into its closed closed position against seat 68.

Turning to FIG. 4, when cap 20 is removed during a refueling operation, the pressure within sensor conduit 35 and chamber C1 falls off rapidly to atmospheric pressure. Because the pressure of the fuel vapor within the fuel tank exceeds atmospheric pressure, valve V1 will be caused to open as a result of the force of the fuel vapors within chamber C4 acting upwardly on diaphragm 52, which force exceeds the force resulting from atmospheric pressure and the force of spring 5 acting upon the upper side of diaphragm 52. As a result, vapors will flow through rollover valve 26 and primary vapor conduit 22 and into chamber C4 and then into chamber C2 and through orifice 50 and then into chamber C3 and then into canister array 28. Orifice 50 is sized so that only a small amount of flow occurs through the orifice. This is desirable because too much flow through orifice 50 will allow overfilling of the fuel tank, since the rollover valve is normally mounted in the highest part of the tank. Orifice 50 is necessitated because pressure within chamber C2 must be vented.

During refueling operation, the predominant flow of vapors generated by the refueling operation will occur through refueling vapor conduit 24 past liquid vapor discriminator 36 and into chamber C5 of fluidic logic controller 34. Again, because the pressure within the fuel tank which acts upon the underside of diaphragm 64 exceeds atmospheric pressure acting within chamber C1 upon the upper side of the same diaphragm, valve V3 will be caused to open, allowing vapors to flow from chamber C5 into chamber C3 and thence out of the valve into integrated canister array 28.

After the refueling operation has finished and cap 20 is installed for normal operation of the vehicle, the situation of fluidic controller 34 will be as shown in FIG. 5. Once cap 20 has been reinstalled, pressure will begin building within chamber C1, and as a result, valve V1 will move to a closed position because the force of spring 54 will be sufficient to hold valve V1 closed, given the fact that the vapor pressure on both sides will be the same. Valve V2 will, however, open because pressure within chamber C2 will be slightly superatmospheric due to the venting action of orifice 50, whereas the pressure within chamber C4 will be tank pressure, which exceeds atmospheric pressure, and which as a consequence is sufficient to lift valve V2 off of seat C2. After valve V2 opens, vapors will flow freely from chamber C4 into chamber C3 and thence into collection canister array 28. Note that in FIG. 5, valve V3 is closed for preventing passage of either vapor or liquid from refueling vapor conduit 24 into integrated canister array 28.

Figure 6:
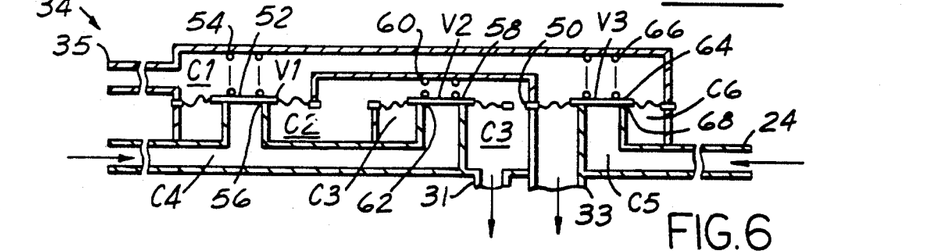
FIG. 6 schematically illustrates another embodiment of the present invention in which the fluid logic controller routes vapors generated during refueling and during normal operation of the vehicle to separate collection canister arrays.

FIG. 6 illustrates a non-integrated diaphragm valve which is similar to that shown in FIGS. 3-5. As the terminology implies, the valve of FIG. 6 is intended to be used with separate refueling and primary canister arrays, as illustrated in FIG. 2. As before, chamber C1 is at atmospheric pressure during refueling operation when fuel cap 20 has been removed. With the replacement of filler cap 20 after refueling operation, chamber C1 builds pressure up to tank pressure level thereby causing valves V1 and V3 to reside in their closed positions, but allowing valve V2 to open in response to tank pressure within chamber C4, because tank pressure acting upon the underside of diaphragm 58 is more than sufficient to overcome the slightly atmospheric pressure of chamber C2 acting upon the upper side of diaphragm 58. Accordingly, vapor is allowed to flow from chamber C4 into chamber C3 and then into primary canister array 32 via primary canister conduit 31.

Operation of the controller of FIG. 6 in the event that the fuel cap is removed, as during a refueling operation, is similar to that of the valve illustrated in FIGS. 3-5. In such case, the fluidic logic controller operates such that a first vapor pathway will be established from refueling vapor conduit 24 into chamber C5 past valve V3 and into chamber C6 and then into refueling canister array 30 via refueling canister conduit 33.

Figure 7:
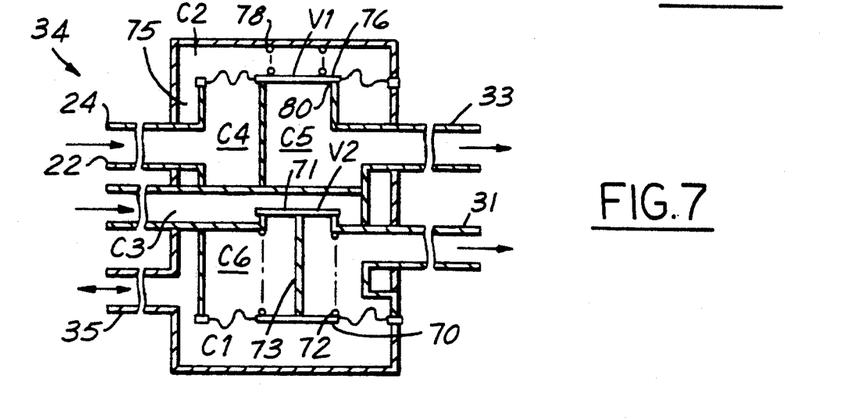
FIG. 7 schematically illustrates another embodiment of a fluidic logic controller according to the present invention incorporating a poppet valve. The controller of FIG. 7 routes the vapors to separate canister arrays for refueling and normal operation.

FIG. 7 illustrates another embodiment of a non-integrated fluidic logic controller according to the present invention in which a poppet valve, V2, controls the flow of fuel vapor from primary vapor conduit 22 into primary canister array 32 via primary canister conduit 31 (FIG. 2). When fuel cap 20 is installed, the pressure within chambers C1 and C2 is equalized at tank pressure. The pressure of chamber C1 and C2 is equalized because annular passageway 75 extending between chamber C1 and C2 allows pressure existing in sensor conduit 35 to be transmitted equally between chambers C1 and C2. With both chambers C1 and C2 at tank pressure, valve V1 is not allowed to open because tank pressure acts on diaphragm 76, along with compression spring 78, to keep the valve in its closed position against seat 80, whereas only slightly superatmospheric pressure in chamber C5 acts upon the underside of diaphragm 76. As a result, vapor is not allowed to flow through refueling vapor conduit 24 and refueling canister conduit 33 into refueling canister array 30. Concurrently, because tank pressure acts upon poppet diaphragm 70, which has a larger area than the poppet of valve V2, which is itself exposed to tank pressure via chamber C3, poppet V2 will be caused to open, thereby allowing vapors to move through chamber C3 and into chamber C6, through which the vapors will flow into primary canister conduit 31.

With the fuel cap removed in a system according to FIG. 2 and incorporating a valve according to FIG. 7, pressure within chambers C1 and C2 drops to atmospheric, and tank pressure acting in chamber C4, upon diaphragm 76, will be sufficient to overcome the force of spring 78 and atmospheric pressure acting downwardly on diaphragm 76. As a result, valve V1 will open, allowing vapors to move through chamber C4 and into chamber C5 and thence into refueling canister conduit 33. Also, because atmospheric pressure is acting on the lower part of poppet diaphragm 70, and because chamber C6 is slightly super atmospheric, the force of gas pressure above poppet diaphragm 70, when combined with poppet spring 72, will be sufficient to maintain valve V2 in a closed position, thereby preventing the passage of vapor through primary vapor conduit 22 and primary canister conduit 31. This will assist in achieving proper filling of the fuel tank without overfilling because the trapping of vapor above the liquid fuel due to complete closure of primary vapor conduit 22 will maintain proper ullage space on the top of the fuel tank.

Figure 8:
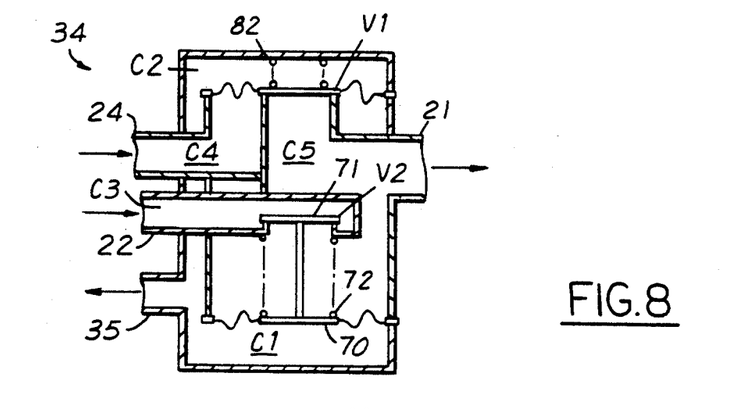
FIG. 8 schematically illustrates another embodiment of a fluidic logic controller according to the present invention in which a poppet helps in the routing of vapors during both refueling and normal operation to a single canister array.

FIG. 8 illustrates an integrated poppet type fluidic logic controller according to the present invention. This controller could be used with a system according to FIG. 1. When filler cap 20 is installed and chambers C1 and C2 are tank pressure, valve V1 will be maintained in a closed position because with tank pressure applied to the entire upper side of the diaphragm of valve V1, but only to a portion of the lower part of the diaphragm reachable by chamber C4, valve V1 will be maintained in a closed position by gas pressure and by spring 82. Vapor will, however, be allowed to flow through poppet valve V2 from chamber C3 which is shown as being connected to primary vapor conduit 22 because the tank pressure acting on the underside of poppet diaphragm 70 will be more than sufficient to overcome the force of poppet spring 72 and the slightly superatmospheric gas pressure within chamber C5 acting on the upper side of poppet diaphragm 70. When the fuel cap is removed, the valve of FIG. 8 will operate to allow the flow from chamber C4 into chamber C5 and then into canister conduit 21 while preventing flow through primary vapor conduit 22 into chamber C3 and past valve V2.

Figure 9:
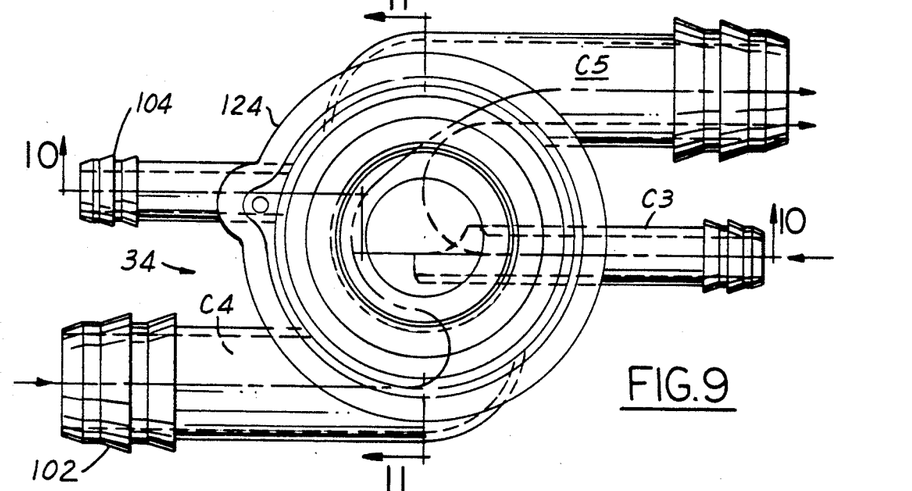
FIG. 9 illustrates a plan view of an integrated fluidic logic controller according to one aspect of the present invention.
Figure 10:
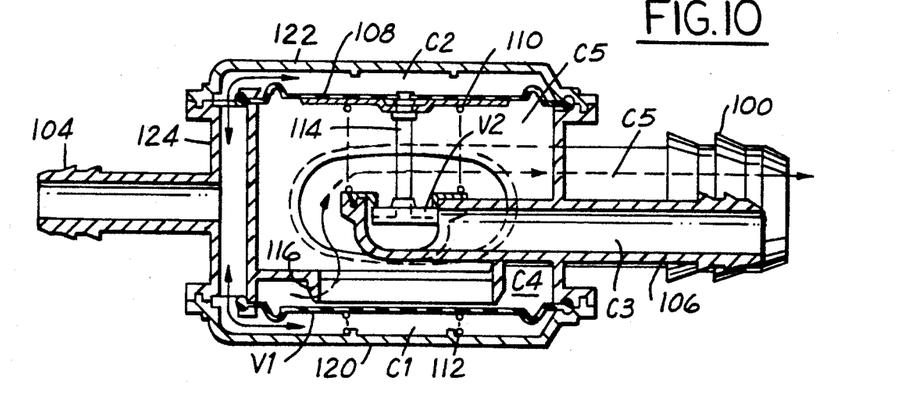
FIG. 10 is a sectional view of the controller of FIG. 9, taken along the line 10—10 of FIG. 9.
Figures 11, 12:
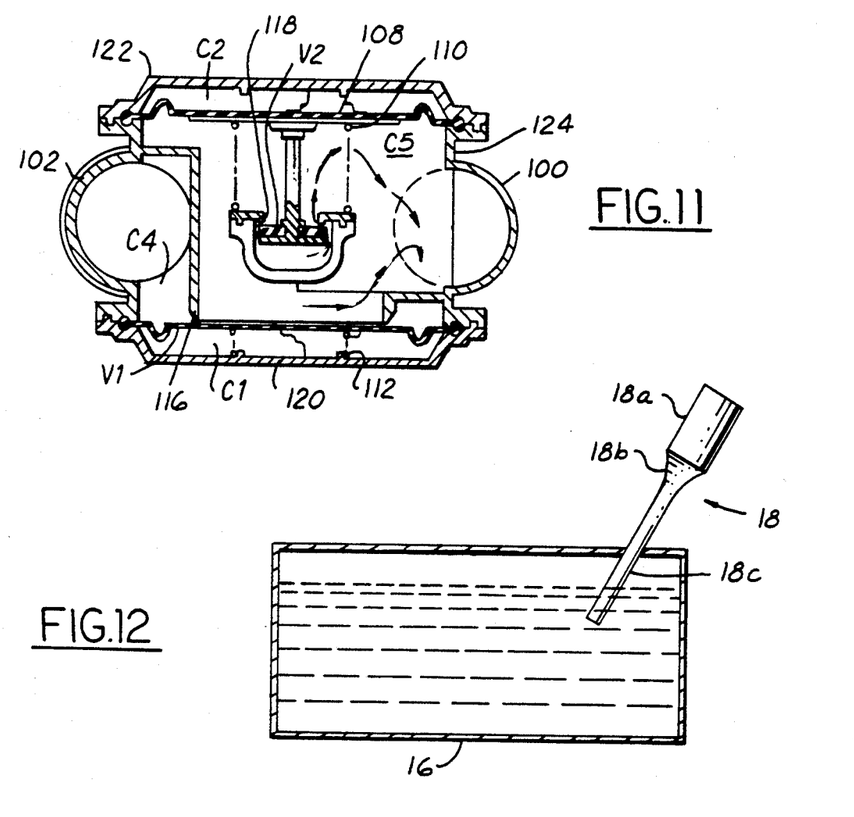
FIG. 11 is a sectional view of the controller of FIGS. 9 and 10, taken along line 11—11 of FIG. 9.
FIG. 12 is a partially schematic representation of a fuel tank according to the present invention having a fill tube according to one aspect of the present invention.

FIGS. 9-11 illustrate an integrated fluidic controller according to one aspect of the present invention. As shown in FIG. 9, fluidic controller 34 has a variety of connectors for attachment to the various fluid conduits associated with a vapor control system according to the present invention. Thus, connector 100, operatively connected with chamber C5, is provided for attaching the fluidic controller to canister conduit 21 (FIG. 1). Similarly, connector 102 is an inlet from refueling vapor conduit 24. As shown in FIG. 9, connector 102 is operatively associated with and forms a part of chamber C4. Connector 104, is provided for attaching controller 34 to sensor conduit 35, and connector 106 operatively attaches the controller to primary vapor conduit 22.

FIG. 10 illustrates the flow which occurs during refueling operation with filler cap 20 removed such that atmospheric pressure acts within chambers C1 and C2. In this case, vapors moving through chamber C4 are allowed to pass through chamber C5 and out of the controller into the integrated collection canister. Note that poppet valve V2 remains closed because only atmospheric pressure acts within chambers C1 and C2. Atmospheric pressure is insufficient to overcome tank pressure acting downwardly on the diaphragm of valve V1 and against the force of atmospheric pressure acting upwardly on the valve diaphragm along with mainspring 112.

FIG. 11 shows the fluidic controller of FIGS. 9 and 10 in the condition in which the fuel cap has been installed. Accordingly, tank pressure is applied in chambers C1 and C2 and such pressure is sufficient to keep valve V1 closed, and as a result, fuel vapors are not allowed to flow through the controller from the refueling vapor conduit. However, the force of tank pressure acting downwardly upon poppet diaphragm 108 is sufficient to overcome the spring force of poppet spring 110, as well the slightly atmospheric pressure acting on the underside of poppet diaphragm 108, and, as a result, poppet valve V2 will be caused to move into the open position shown in FIG. 11, thereby allowing vapors to move through the primary vapor conduit and through the fluid logic controller into canister conduit 21.

Those skilled in the art will appreciate in view of this disclosure that housing 124 of fluidic logic controller illustrated at FIGS. 9-11 could be constructed of various thermosetting and thermoplastic materials, as well as many other metallic and non-metallic compositions suitable for the practice of this invention and suggested by this disclosure. Similarly, various valve diaphragms illustrated herein can be comprised of fluorosilicone or other types of elastomeric materials known to those skilled in the art and suggested by this disclosure. Finally, variations are possible in the configurations of the system geometry as well in the layouts of the various fluidic controller devices.

FIG. 12 illustrates a fill tube according to an aspect of the present invention in which fill tube 18 has an entry section 18a with a converging section 18b attached thereto and with a tail section 18c attached to the converging entry section. The tube may be comprised of either separate segments or a single unitary structure. The tail section has an interior diameter which is equal to the smallest diameter of the converging entry section. As a result, fuel flowing through entry section 18a into converging entry section 18b and then into tail section 18c will entrain fuel vapor into the flowing stream of liquid fuel, and, as a result, refueling vapor which would otherwise escape through the outboard end of the fill tube will be caused to pass into fuel tank 16 for processing by the present system. Those skilled in the art will appreciate in view of this disclosure that FIG. 12 does not include any of the other details of the present invention, such as refueling or primary vapor conduits or sensor conduit 35. It is expected, however, that sensor conduit 35 would be attached to fill tube 18 in the region of entry section 18a.

Figure 13:
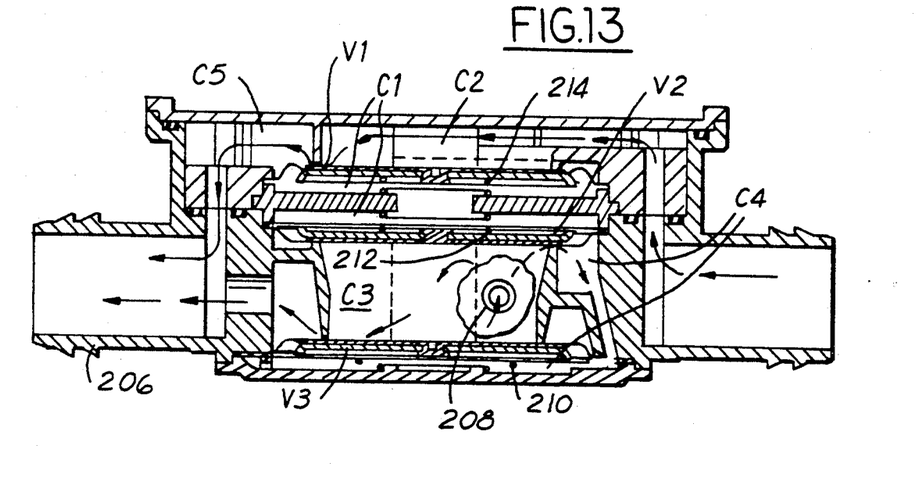
FIG. 13 illustrates another controller employing three unitary diaphragm valves.

FIG. 13 illustrates another type of fluidic controller according to the present invention which employs three unitary diaphragm valves labeled V1, V2, and V3. The controller of FIG. 13 is of the integrated diaphragm type. Vapors entering the controller from inlet 205 which is attached to refueling vapor conduit 24 are allowed to flow into chamber C2 and past valve V1 into chamber C5 and then into outlet 206 during refueling because chamber C1, the signal chamber, is at atmospheric pressure with filler cap 20 removed, whereas chamber C2 is at tank pressure. At the same time, vapors entering the controller via primary vapor conduit connector 208 are allowed to pass valve V2 into chamber C4 and then into outlet 206 through a small orifice (not shown). Valve V2 is allowed to open because atmospheric pressure in chamber C1 is overcome by tank pressure within chamber C3. During refueling, valve V3 is kept closed because the pressure within chamber C4, which acts to close the valve with the assistance of compression spring 210, is approximately equal to the tank pressure acting to open valve V3. Conversely, during normal operation, tank pressure is present within chamber C1 and valve V2 is held closed by the unbalanced force provided by compression spring 212. As one result, vapor passing into the controller through the primary vapor conduit is allowed to pass through valve V3 because tank pressure acting to open the valve causes a force buildup on the diaphragm which exceeds the force provided by the slightly atmospheric canister pressure on the bottom of the valve diaphragm, which is combined with the force of spring 210. And, because valve V2 has tank pressure acting on both of its pressure surfaces, the force of spring 214 will keep valve V2 closed, preventing flow through the refueling vapor portion of the system.

While only certain embodiments of the present invention have been described, it will be apparent to those skilled in the art that various changes and modifications may be made therein without departing from the spirit and scope of the present invention as claimed.

I claim:

1. A fuel tank and fuel vapor control system for use with an air-breathing, liquid fueled automotive vehicle engine comprising:
   a fuel tank;
   a fill tube for introducing liquid fuel into the tank, with said tube having a closure device;
   a primary vapor conduit for conducting fuel vapor from the tank when the closure device is closed;
   a refueling vapor conduit for conducting fuel vapor from the tank when the closure device is open for refueling;
   a canister for collecting fuel vapor from said tank; and
   a fluidic logic controller connected to said canister and to the primary and refueling vapor conduits and further connected to a sensor conduit positioned to sense the fluid pressure within the fill tube in the region in which the closure device is installed, with said controller comprising means for establishing a vapor pathway extending between the refueling vapor conduit and the canister when the fluid pressure within the sensor conduit is at a level indicating that the closure device is open, with said controller further comprising means for establishing a vapor pathway extending between the primary vapor conduit and the canister when the pressure within the sensor conduit is at a level indicating that the closure device is closed.

2. A fuel tank and fuel vapor control system according to claim 1, further comprising a rollover valve positioned in said primary vapor conduit between said fuel tank and said controller such that said rollover valve will restrict the passage of liquid fuel from the tank into the controller in the event that a vehicle equipped with a system according to the present invention is displaced from its normal operational attitude by more than a predetermined amount.

3. An automotive fuel tank and fuel vapor control system according to claim 1, further comprising a liquid/vapor discriminator valve positioned in said refueling vapor conduit between said fuel tank and said controller so as to restrict the entry of liquid fuel into said control valve from the tank during refueling operation.

4. An automotive fuel tank and fuel vapor control system according to claim 1, further comprising a liquid/vapor discriminator valve positioned between said canister and said controller.

5. An automotive fuel tank and fuel vapor control system according to claim 1, further comprising a purge conduit extending between said canister and the air intake system of said engine so as to permit the passage of fuel vapors from said canister into said engine, with such passage being controlled by a purge valve positioned in the purge conduit between the canister and the engine.

6. An automotive fuel tank and fuel vapor control system according to claim 1, further comprising means for allowing a restricted flow between the primary vapor conduit and the canister when the closure device is open.

7. An automotive fuel tank and fuel vapor control system according to claim 1, wherein said fill tube comprises a converging entry section adapted to accommodate a gasoline pump nozzle, and a tail section extending from the entry section to the fuel tank and having an interior diameter which is equal to the smallest diameter of said converging section.

8. A fuel tank and fuel vapor control system for use with an air-breathing, liquid fueled automotive vehicle engine comprising:
   a fuel tank;
   a fill tube for introducing liquid fuel into the tank, with said tube having a fill cap;
   a primary vapor conduit for conducting fuel vapor from the tank when the cap is installed;
   a refueling vapor conduit for conducting fuel vapor from the tank when the cap is removed for refueling;
   a primary canister for collecting fuel vapor from said tank when the cap is installed;
   a refueling canister for collecting fuel vapor from said tank during refueling; and
   a fluidic logic controller connected to said canisters and to the primary and refueling vapor conduits and further connected to a sensor conduit positioned to sense the fluid pressure within the fill tube in the region in which the cap is installed, with said controller comprising means for establishing a single vapor pathway extending between the refueling vapor conduit and the refueling canister when the pressure within the sensor conduit is at a level indicating that the cap has been removed, with said controller further comprising means for establishing a single vapor pathway extending between the primary vapor conduit and the primary canister when the pressure within the sensor conduit is at a level indicating that the cap has been installed.

9. An automotive fuel tank and fuel vapor control system according to claim 8, further comprising a rollover valve positioned between said fuel tank and said primary vapor conduit, such that said rollover valve will restrict the passage of fuel from the tank and into the primary vapor conduit in the event that a vehicle equipped with a system according to the present invention is subjected to more than a predetermined displacement from its normal operational attitude.

10. An automotive fuel tank and fuel vapor control system according to claim 8, further comprising a liquid/vapor discriminator valve positioned between said fuel tank and said refueling vapor conduit so as to restrict the entry of liquid fuel into said control valve from the refueling vapor conduit.

11. An automotive fuel tank and fuel vapor control system according to claim 8, further comprising a primary purge valve positioned in a primary purge conduit extending between said primary vapor canister and the engine air intake so as to control the passage of fuel vapor from said primary vapor canister to the engine, with said system further comprising a refueling purge valve positioned in a refueling purge conduit extending between said refueling vapor canister and the engine air intake so as to control the passage of fuel vapor from the refueling canister to the engine.

12. An automotive fuel tank and fuel vapor control system according to claim 8, further comprising a liquid/vapor discriminator valve positioned between said refueling canister and said controller.

13. An automotive fuel tank and fuel vapor control system according to claim 8, wherein said fill tube comprises a converging entry section adapted to accommodate a gasoline pump nozzle, and a tail section having an interior diameter which is equal to the smallest diameter of said coverging section.

14. An automotive fuel tank and fuel vapor control system comprising:
   a fuel tank;
   a fill tube for introducing liquid fuel into the tank, with said tube having a fill cap;
   a primary vapor conduit for conducting fuel vapor from the tank when the cap is installed;
   a refueling vapor conduit for conducting fuel vapor from the tank when the cap is removed for refueling;
   a canister for collecting fuel vapor from said tank; and
   a fluidic logic controller connected to said canister and to the primary and refueling vapor conduits and further connected to a sensor conduit positioned to sense the fluid pressure within the fill tube in the region in which the cap is installed, with said controller comprising means for establishing two discrete, mutually exclusive pathways between said canister and said vapor conduits, including a first pathway extending between the refueling vapor conduit and the canister when the fluid pressure within the sensor conduit is approximately atmospheric, indicating that the cap has been removed, and a second pathway extending between the refueling vapor conduit and the canister when the pressure within the sensor conduit is at a superatmospheric level, indicating that the cap has been installed.

15. An automotive fuel tank and fuel vapor control system according to claim 14, further characterized in that said primary vapor conduit is situated in an upper region of said tank such that closure of said second pathway during refueling will cause pressure to build above the fuel in the tank so as to prevent overfilling of the tank.

16. An automotive fuel tank and fuel vapor control system according to claim 14, wherein said fill tube comprises a converging entry section adapted to accommodate a gasoline pump nozzle, and a tail section having an interior diameter which is equal to the smallest diameter of said coverging section.

* * * * *